Patented Oct. 29, 1946

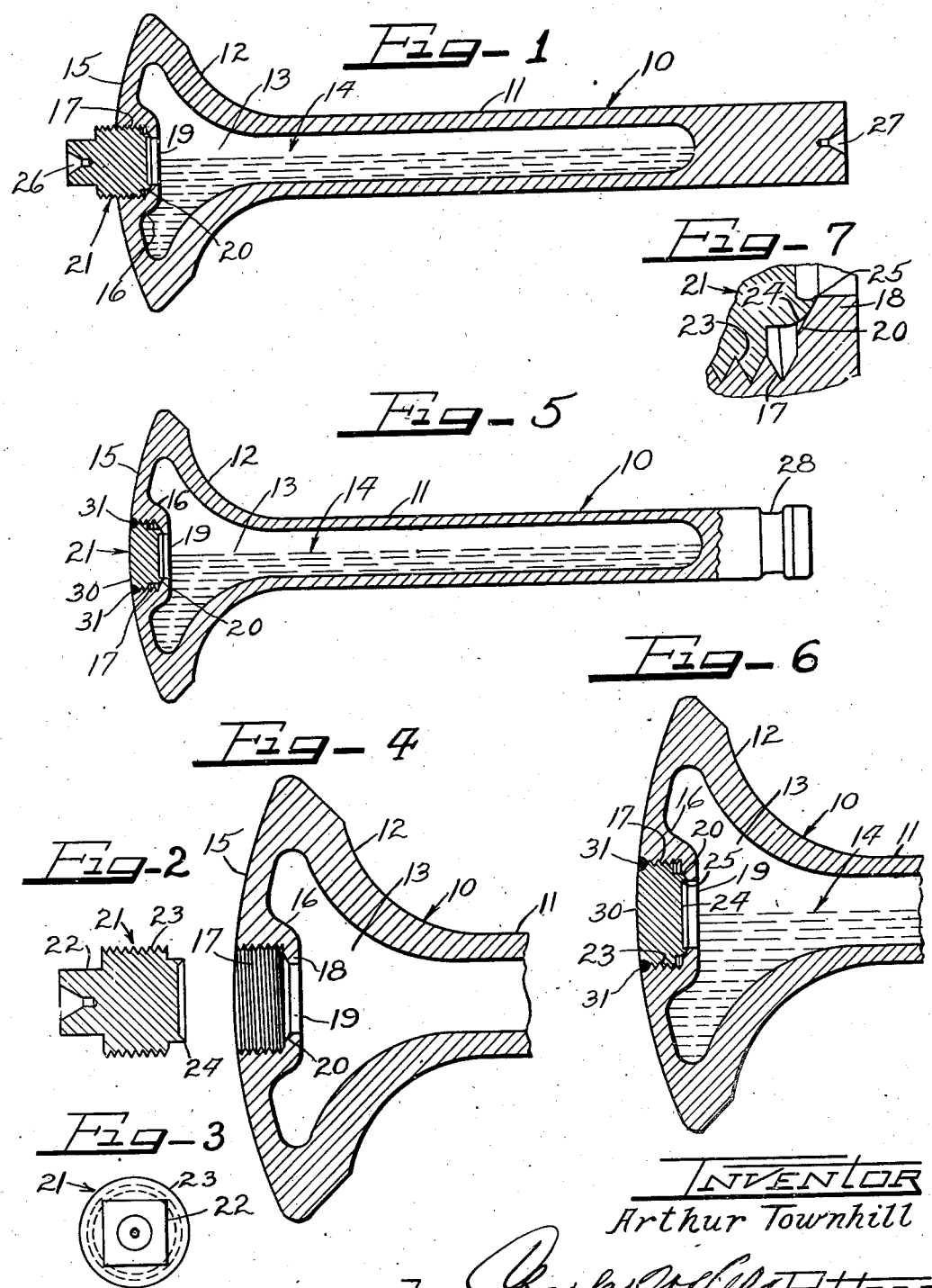

2,410,190

UNITED STATES PATENT OFFICE 2,410,190

METHOD OF MAKING PLUG TYPE HOLLOW POPPET VALVES

Arthur Townhill, Cleveland, Ohio, assignor to Thompson Products, Inc., Cleveland, Ohio, a corporation of Ohio Application February 4, 1944, Serial No. 521,115

1 Claim. (Cl. 29—156.7)

This invention relates to a method of making a hollow poppet type valve and a closure plug for the head thereof, and more particularly to the manner in which the plug is inserted and attached to the head of the valve.

It is important in the fabrication of poppet valves having on the interior thereof a heat dissipating coolant that every precaution be taken against leakage of fluid into the interior of the valve so as to prevent oxidation or other deleterious effects on the coolant. This problem becomes of considerable moment at the plugged filler opening of a valve since, for example, where metallic sodium is employed as the heat-dissipating filler, any leakage of air around the threads of the plug into the interior of the valve will result in oxidation of the coolant, thereby detracting from its efficiency.

An object, therefore, of this invention is to provide a method of making a poppet valve construction including a closure plug for the filler opening with a simple but efficient improvement which will obviate the occurrence of leakage of the above-mentioned character.

Another object of this invention is to provide a novel but simple way of securing a plug in a filler opening of a hollow valve whereby the plug not only serves its usual function of filling the opening, but in addition establishes a seal against leakage of fluid past the threads of the plug and into the interior of the valve.

A further object of the invention relates to the provision of an inexpensive and simple type of plug which may be readily used for the purpose of establishing a seal in the filler hole of a hollow poppet type valve.

In accordance with the general features of this invention there is provided a method of making a valve having at least the head portion thereof formed hollow and filled with a heat-dissipating coolant previously introduced in the valve through the end opening and also having a plug secured in the opening and having an inner portion thereof deflected into a metal-to-metal sealing contact with a shoulder at the inner extremity of the opening to form a seal at that point.

Still another feature of the invention relates to the securing of the plug to the valve head portion partly by a threaded fit in the filler opening and partly by being welded to the valve head portion, whereby said welded attachment will assist in maintaining the seal established at the inner extremity of the plug.

Yet another feature of the invention relates to the provision of a new method of sealing the plug in the end filler opening of the head of a hollow poppet valve whereby the force of inserting the plug in the opening is employed to establish a seal between the inner extremity of the plug and the filler opening in the head of the valve.

Other objects and features of this invention will more fully appear from the following detail description, taken in connection with the accompanying drawing which illustrates a single modification of the invention, and in which Figure 1 is a cross-sectional view through a semi-finished valve embodying the features of this invention;

Figure 2 is an enlarged cross-sectional view taken through the plug of my invention prior to the insertion of the plug in the filler opening of the poppet valve;

Figure 3 is an end view of the plug shown in Figure 2 looking at it from the left-hand side of the plug;

Figure 4 is an enlarged fragmentary cross-sectional view of the head portion of the valve shown in Figure 1 but with the plug removed therefrom so as to show clearly the contour of the end opening in the valve head portion;

Figure 5 is a cross-sectional view of the valve structure of Figure 1 but showing the valve in its finished condition after the plug has been finally inserted and cut and after the valve has been shaped to the desired form;

Figure 6 is an enlarged fragmentary sectional view corresponding to the left-hand end of Figure 5 showing in detail the construction of the head of the valve after the plug has been finally secured therein; and Figure 7 is an enlarged fragmentary cross-sectional view corresponding to a portion of Figure 6 showing more in detail the manner in which the inner lip or skirt on the plug is deflected along the inclined surface of the flange at the inner extremity of the filler or plug opening in the head end of the valve.

As shown on the drawing:

The valve of my invention is illustrated in both Figures 1 and 5, it being shown in a semi-finished condition in Figure 1 and in its finished form in Figure 5. For this reason, the same reference numerals are being used in both of these figures to identify corresponding parts or portions.

The reference character 10 designates generally the hollow poppet type of valve embodying the features of this invention and which is especially adapted for use in internal combustion engines and the like. This type of valve, as is well known in the art, embodies a stem or shank portion 11 and a head portion 12. In order to cool properly the valve, it is desirable to form at least the head portion thereof hollow, although as I have illustrated it, the stem is also formed hollow, as indicated at 13. This hollow portion 13 may be filled with any suitable heat dissipating coolant, such, for example, as metallic sodium which has been successfully used to withstand the tremendous heat to which the valve is subjected in operation, as where it is used as an exhaust valve. I have designated the coolant generally by the reference character 14.

The semi-finished valve piece as shown in Figure 1 may be fabricated in any suitable manner and any suitable material may be employed for the same. For illustration, the valve piece may comprise a single steel casting. It should also be noted at this time that the plug, which I shall describe hereinafter, may be made of the same type of material as is employed in the single piece cast valve.

As best shown in Figure 4, the head portion 12 of the valve is provided with a curved outer face which, at its center has a tapped threaded central opening 17 extending through a thickened inwardly offset portion 16 formed integral with the head portion of the valve. The tapped hole may be supplied with any suitable form of thread although I have found that V-type pipe thread may be advantageously used.

The thread 17 at its inner extremity terminates in a flange or shoulder 18 which extends radially inward of the thread and has a smaller size or restricted opening 19 coaxial with the threaded opening 17. This opening 19 communicates with the hollow interior of the valve stem.

The lowermost thread of those in the opening 17 terminates in a shouldered surface which in turn terminates in an inclined or slanting surface 20 which extends clear to the opening 19. I propose to utilize this inclined surface 20 in the sealing of my plug 21 in the valve head.

The valve plug is designated generally by the reference character 21 and is shown in Figure 2 in a position preparatory to its insertion in the threaded hole 17 in the valve head portion 12 of the valve. This plug 21 includes a squared wrench-gripping portion 22 (Figures 2 and 3), an intermediate threaded portion 23, and a reduced lip or skirt-like portion 24 which is of a diameter such that it can engage and cooperate with the inclined surface 20 of the valve head upon the screwing of the plug into the tapped hole 17.

In the assembly of the valve the plug 21 is screwed into the tapped hole 17 until it is brought into the position shown in Figure 1. In this position the threads on the plug are in tight cooperation with the threads of the threaded hole 17, and the annular lip on the skirt portion 24 is deflected radially inwardly along the inclined surface 20 in the thickened center portion 16 of the head portion of the valve.

As best shown in Figure 7, it will be perceived that the thin edge of the lip portion 24 is caused at 25 to be turned radially inwardly along the inclined surface 20 as the plug is progressively threaded into tight engagement with the hole in the head of the valve. This deflected lip 25 thus by reason of its wedged tight engagement with the inclined surface 20, establishes a tight metal-to-metal contact which results in the forming of a seal at the inner extremity of the hole in the head of the valve.

After the plug 21 has thus been properly seated in the head of the valve, the valve is axially supported in suitable mechanism and is shaped to the contour shown in the finished state of the valve illustrated in Figure 5. It will be clear from Figure 1 that the plug 21 has a center hole 26 and likewise the valve stem portion 11 has a center hole 27, which two center holes are in substantial axial alignment. These center holes may be used in mounting the valve in suitable equipment for shaping the same into the finished condition. In this finishing of the valve, it is brought down to the size desired and it is formed with the usual spring seat retainer groove 28. Thereafter, the projecting end of the plug is cut off so that the outer end of the plug is formed flush with the curved surface 15 of the valve head portion. In fact, the cutting of the plug is such that its cut surface is symmetric with the curved top surface 15 of the valve head, as designated at 30 in Figures 5 and 6.

From the foregoing it is clear that prior to the insertion of the plug in the head of the valve the hollow interior of the valve is filled with a suitable heat-dissipating coolant, such, for example, as metallic sodium. I have found that excellent results may be obtained by filling the cavity in the valve to the extent of 65% of its volume with solid metallic sodium.

After the filling of the valve, the plug is inserted therein as described before so that it is held in tight sealed engagement by reason of its inner lip portion 24 being deflected radially inwardly along and in tight engagement with the inclined surface 20 of the inward offset 16 on the head portion of the valve. This sealing of the plug in position is highly desirous in that it aids in preventing leakage of fluid or air into the interior of the valve; such leakage having been found to be very undesirable for the reason that the metallic sodium is readily oxidizable and, when oxidized, it loses its efficiency as a heat dissipating coolant. Moreover, the oxidation of the metallic sodium has deleterious effects on the interior walls of the valve.

It is also desirable to firmly hold the plug in its sealed and retained position, and this may be accomplished after the cutting off of the plug end by welding the plug to the head portion 12 as indicated at 31 in Figures 5 and 6.

It has been observed that during the welding of the plug due to the heating up of the valve and the threads, air leaking through the threads tends to readily oxidize the sodium. In other words, the oxidation of the sodium occurs very readily when the same is subject to high temperatures. By using the seal of my invention previously described, the plug may be welded to the head of the valve without the occurrence of such oxidation since any air is prevented from coming into contact with the sodium filler.

The above description makes it clear that I have not only provided a novel valve of the hollow poppet type, but in addition I have provided a novel plug for closing the filler hole of the valve, and which plug is so formed as to establish a seal when it is inserted in a hole in the head of the valve. My novel method of accomplishing this sealing operation is believed to be fully evident from the foregoing detailed description and a repetition of the steps involved is not thought to be necessary.

I claim as my invention:

The method of sealing a coolant-filled hollow poppet valve body having an internally threaded plug-receiving filler aperture equipped with an annular axially tapered shoulder adjacent its inner end and so disposed as to block the advance of an externally threaded aperture-filling plug having a continuous annular skirt on the inner end disposed to engage the taper of the shoulder when the plug is advanced into initial shoulder-engaging position, which comprises screwing the plug into the aperture beyond the point where said skirt initially engages the shoulder to deflect the skirt by means of the taper of the shoulder as the skirt is rotated relative thereto and effect metal-to-metal contact with a substantial annular area of said shoulder and establishing a seal between the coacting skirt and shoulder surfaces throughout said annular area, and welding the plug to the valve body externally of said annular area and the hollow sealed by it.

ARTHUR TOWNHILL.